United States Patent [19]

Fujita et al.

[11] Patent Number: 4,582,368
[45] Date of Patent: Apr. 15, 1986

[54] DRY BEARING

[75] Inventors: Masahito Fujita; Noboru Okabe, both of Chiba, Japan

[73] Assignee: NDC Company, Ltd., Chiba, Japan

[21] Appl. No.: 730,603

[22] Filed: May 6, 1985

[51] Int. Cl.<sup>4</sup> ............................................. F16C 33/12
[52] U.S. Cl. ................... 308/5 R; 308/241; 384/279; 384/286; 384/300; 384/902; 384/907; 384/908; 384/912
[58] Field of Search ........... 308/5 R, 241, DIG. 8, 308/DIG. 9, DIG. 5, DIG. 7; 384/902, 908, 912, 910, 909, 907, 300, 298, 279, 286

[56] References Cited

U.S. PATENT DOCUMENTS

| | | | |
|---|---|---|---|
| 2,798,005 | 7/1957 | Love | 308/DIG. 5 |
| 4,053,665 | 10/1977 | Orkin | 308/241 |
| 4,105,263 | 8/1978 | Sorensen | 308/241 |
| 4,308,153 | 12/1981 | Mori | 308/5 R |

Primary Examiner—Lenard A. Footland
Attorney, Agent, or Firm—Sughrue, Mion, Zinn, Macpeak and Seas

[57] ABSTRACT

A method of manufacture of a dry bearing material for high speed, high load purposes is disclosed. A resin paste obtained by kneading together a polytetrafluoroethylene (PTFE) resin and a solid lubricant is coated on a porous metallic sintered layer formed on a steel plate such that it fills the interstices of the sintered layer and covers the surface thereof. The solid lubricant is in a thinly rolled state obtained from pulverized solid lubricant, and it is distributed a leaflike or scalelike form and in a striation consisting of multiple layers spaced apart one above another.

3 Claims, 8 Drawing Figures

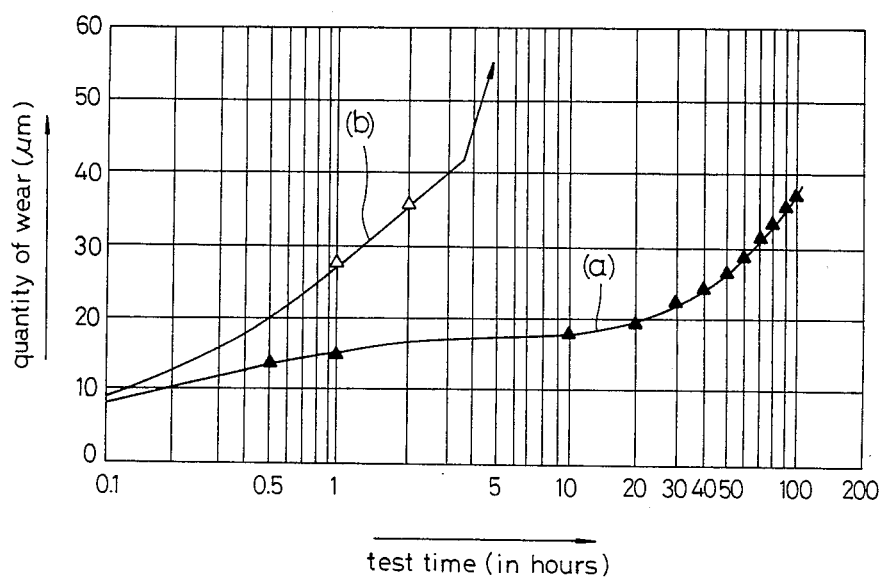

DRY BEARING

BACKGROUND OF THE INVENTION

This invention relates to a method of manufacture of a dry bearing for high speed, high load purposes.

A lubrication-free or dry bearing such as for example disclosed in Japanese Patent Publication No. 39-16950 is already known. In this Patent Publication, the dry bearing has a porous metallic sintered layer formed from copper or copper alloy powder on a steel plate, with the pores of the sintered layer impregnated with a mixture of polytetrafluoroethylene (PTFE) resin and lead oxide. As shown in FIG. 1, the disclosed dry bearing comprises a porous metallic sintered layer 4 formed on a steel plate 5 and impregnated with PTFE resin 3, in which is dispersed a solid lubricant such as metallic lead 1 in a pulverized form or in a form of masses. The lubricating property of this bearing is enhanced by the PTFE resin and is further improved by the metallic lead 1 in the powdery form or in the form of masses. Thus, this dry bearing has very excellent lubricating property compared to other dry bearings. However, it has been developed in order that it can withstand a load of 1,000 to 1,500 $kg/cm^2 \cdot m/min$ in terms of the PV value at the most, so that it can not withstand loads higher than this level. Meanwhile, there are demands for reducing size and weight and increasing speed of automobiles, particularly future automobiles, and this calls for dry bearings capable of withstanding high speed and high load above a PV value of 1,500 $kg/cm^2 \cdot m/min$. Although the prior art dry bearing disclosed in the Japanese Patent Publication No. 39-16950 and shown in FIG. 1 can be used for low speed, low load purposes as noted above, it cannot withstand but would be seized in high speed, high load uses.

In the dry bearing shown in FIG. 1, the metallic lead 1, which is dispersed as solid lubricant in the PTFE resin 3, is not uniformly dispersed. Besides, it is dispersed in a pulverized form or in a form of masses. Further, its melting point is as low as 327° C. Therefore, under high load operating conditions with high peripheral speed and surface pressure and with a PV value higher than 1,500 $kg/cm^2 \cdot m/min$, the pressure on and temperature of the shaft support surface or frictional surface increased so much that the metallic lead 1 is fused and lost. Particularly, as high PV value condition as 3,000 $kg/cm^2 \cdot m/min$ cannot be withstood at all. Further, because of the lack of uniformity of the dispersion of the metal, the loss of metal due to fusion does not occur uniformly, leading to local surface portions free from metallic lead 1 even under a condition corresponding to a PV value of about 1,500 $kg/cm^2 \cdot m/min$. In such a case, the load cannot be withstood sufficiently and uniformly, resulting in local aggressive wear.

SUMMARY OF THE INVENTION

The inventors have conducted researches and investigations concerning a dry bearing having a structure capable of withstanding high speed, high load operating conditions in excess of a PV value of 1,500 $kg/cm^2 \cdot m/min$, and it has been found that the solid lubricant has to be in a thin form such as scales of fish and properly dispersed in this form in the resin. With this structure, the solid lubricant is pulverized on the frictional surface to form a lubricating surface. Therefore, even if loss due to fusion takes place considerably on the surface, supplementary solid lubricant is supplied continuously from the inside of the resin to make up for the loss. Solid lubricant thus is present on the frictional surface at all time while the bearing is in use. In other words, when the consumption of the solid lubricant is accelerated with increase of the temperature and load, a corresponding amount of solid lubricant is progressively supplied from the inside to maintain sufficient lubricating property. Further, the lost solid lubricant is attached to the supported engine shaft or the like, thus further improving the lubricating property.

The solid lubricant may be lead oxide, lead, graphite, molybdenum disulfide and any other materials generally employed. It is not provided in a pulverized form or in a form of masses as in the prior art, but it is provided in a thin form, a leaf-like or scalelike form. Further, it is dispersed in the resin in the interstices of the porous metallic sintered layer such that it extends in the leaf-like or scalelike form and also in a striation consisting of multiple layers spaced apart one above another.

More specifically, the dry bearing according to the invention features that a layer of a resin mixture paste consisting of a solid lubricant and polytetrafluoroethylene resin is formed such as to fill the interstices defined by metallic particles of a porous metallic sintered layer formed on a steel plate and also cover the sintered layer, with the solid lubricant dispersed in the resin layer in a thin form, e.g., a leaf-like or scalelike form and also in a striation consisting of multiple layers spaced apart one above another and extending substantially parallel with the surface of the sintered layer and also curved and plane surfaces of the internal metallic particles of the sintered layer.

Since the solid lubricant is provided in a thin form such as leaf-like or scalelike form, the frictional surface can maintain sufficient lubricating property even under high speed, high load operating conditions with a PV value of 1,500 $kg/cm^2 \cdot m/min$ or above. The lubricating property is sufficient to eliminate seizure. Further, since the solid lubricant extends in a striation consisting of multiple layers spaced apart one another and continuously extending substantially parallel to the curved or plane surfaces of the metallic particles of the porous metallic sintered layer, the frictional surface is replenished with the solid lubricant to make up for an increase of consumption of the solid lubricant with an increase of the load or temperature. Thus, a constant lubricating property can be maintained at all time.

BRIEF DESCRIPTION OF THE DRAWING

The invention will now be described in greater detail with reference to the drawings.

FIG. 8 is a graph showing the results of tests on the embodiment of the dry bearing according to the invention and the prior art dry bearing about wear at a PV value of 3,000 kg/cm$^2$.m/min.

DESCRIPTION OF THE PREFERRED EMBODIMENT OF THE INVENTION

Figure 2:
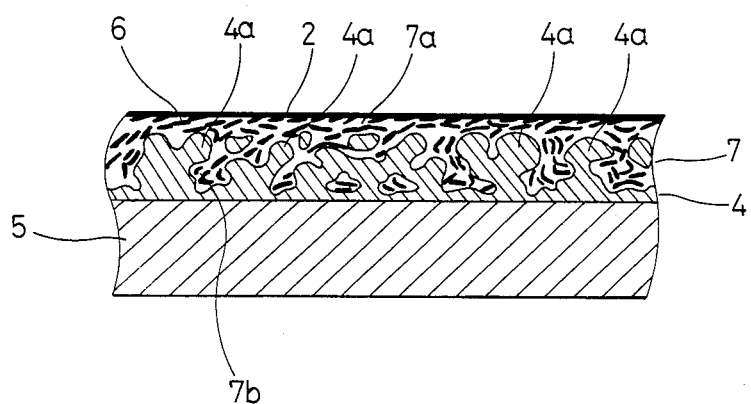
FIG. 2 is a fragmentary enlarged-scale sectional view showing an embodiment of the dry bearing according to the invention.

Referring now to FIG. 2, reference 4 designates a porous metallic sintered layer formed on a steel plate 5. The sintered layer 4 is formed by sintering powdery copper or copper alloy. The sintered layer 4 is impregnated with PTFE resin, forming an impregnating layer 7b. The PTFE resin has a surface layer 7a covering the sintered layer 4, the surface layer 7a constituting together with the impregnating layer 7b a resin layer 7. More specifically, the surface layer 7a of the resin layer 7 covers the surface of the sintered layer 4, while the impregnating layer 7b fills the interstices defined by the metallic particles 4a of the sintered layer 4, the surface layer 7a and impregnating layer 7b being integral, the solid lubricant 6 being dispersed in the resin layer 7 having this structure.

The solid lubricant 6, unlike the prior art solid lubricant, is not obtained by pulverizing lead or the like, i.e., it is not in a form of particles or masses, but it is in a thin form, e.g., a leaf-like or scalelike form. That is, in a thin form having a certain necessary width, particularly its shape being like scales of fish (hereinafter this shape being referred to as scalelike). This shape of solid lubricant 6 can be readily obtained by thinly rolling pulverized solid lubricant. The solid lubricant 6 in this form extends continuously and substantially parallel with curved or plane surfaces of the metallic particles 4a of the sintered layer 4. More specifically, the scalelike solid lubricant 6, as a whole, is present in a striation consisting of multiple layers spaced apart one above another with respect to each metallic particle 4a as center, as shown in FIG. 2. It is to be noted that the scalelike solid lubricant 6 incorporated in the surface layer 7a and impregnating layer 7b of the resin layer 7, is not dispersed without any directivity as in the prior art, but it is dispersed with a fixed directivity; it extends substantially parallel to the curved or plane surfaces of the individual metallic particles 4a. With the above structure, the thin solid lubricant 6, e.g., in a leaf-like or scalelike form, is finely pulverized at the start of use by the surface pressure acting between the frictional surface and counterpart surface of a shaft or the like, so that a thin lubrication layer 2 is formed. This does occur oven if the solid lubricant is fused. With process of wear, the sintered layer 4 eventually may be partly exposed as the bearing surface. In this case, the solid lubricant 6 is supplied toward the bearing surface continuously and constantly. The bearing surface thus is covered by a lubricating layer 2 of the solid lubricant 6 at all time, so that an excellent lubricating performance can be obtained.

Figure 3:
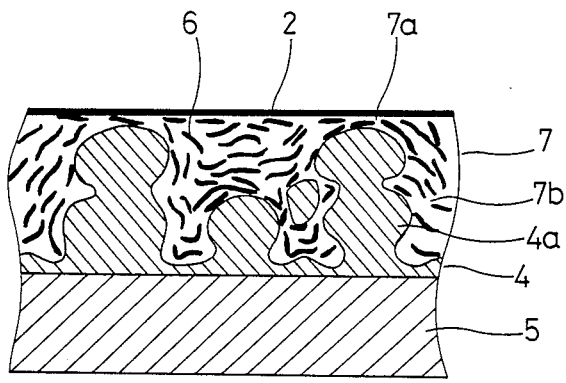
FIG. 3 is a fragmentary enlarged-scale sectional view of the dry bearing of FIG. 2, illustrating a lubricating state of the bearing surface under a high speed, high load operating condition.

This aspect will now be described in greater detail. The dry bearing shown in FIG. 2, is in a lubricating state as shown in FIG. 3 at the start of its use. The solid lubricant 6 in the surface layer 7a is dispersed in the leaf-like or scalelike form and also in a striation consisting of multiple layers substantially parallel to the surfaces of the metallic particles 4a of the sintered layer 4 formed on the steel plate 5. With a pressure applied to the bearing surface by the counterpart member, the solid lubricant 6 in the surface layer 7a, particularly near the lubricating surface, is immediately pulverized with a shearing force acting on the surface. The finely pulverized solid lubricant 6 (with diameters below 1μ) is collected on the surface to form the lubricating layer 2 having a uniform thickness. In other words, the thinly rolled solid lubricant 6 is immediately pulverized by a surface pressure applied to it, and this character serves an important role in the formation of a high performance lubricating surface. Further, the finely pulverized solid lubricant 6 and part of the surface layer 7a of the resin layer 7 coagulatedly attach to the counterpart member such as a shaft to maintain the lubricating property.

Figure 4:
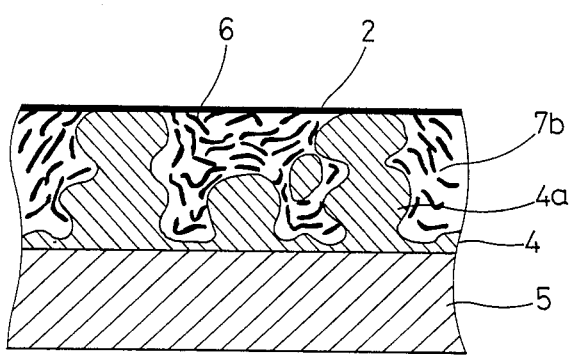
FIG. 4 is a fragmentary enlarged-scale sectional view of the dry bearing of FIG. 2, illustrating a lubricating state of the bearing surface after a progress of wear from the start of use in the state shown in FIG. 3.

As wear proceeds, the surface layer 7a eventually disappears, and the top of the sintered layer 4, i.e., metallic particles 4a thereof, is exposed as well as the impregnating layer 7b is exposed, as shown in FIG. 4. In this situation, the solid lubricant 6, which is dispersed in the interstices of the sintered layer 4 is a striation consisting of multiple, thinly rolled layers extending substantially parallel to the surfaces of the metallic particles 4a, is finely pulverized by the surface pressure, and with the process of wear it is collected on top of the exposed metallic particles 4a to form a thin lubricating layer 2. Therefore, satisfactory lubricating property can be maintained even with the progress of wear.

The dry bearing having the structure as described above is manufactured as follows. First, lead oxide or the like is pulverized in the ordinary way to obtain a solid lubricant in the form of particles or masses as in the prior art. Then, the solid lubricant in this form is thinly rolled into a scalelike form. At this time, the solid lubricant may be thinly rolled in any direction so long as it is thinly rolled. Further, it is possible to use metallic lead instead of lead oxide as the starting material of the solid lubricant. When metallic lead is thinly rolled after pulverization, the surface of the resultant scalelike metallic lead is rendered active. Thus, the surface of the metallic lead is oxidized when forming the resin layer, whereby lead oxide can be obtained as will be described later in detail.

In a subsequent step, the scalelike sold lubricant is added to a PTFE resin dispersion separately prepared, and the system is kneeded to obtain a paste. The kneeding is done as follows. The solid lubricant is added to the dispersion by adding an organic solvent and uniformly agitating the system to obtain a paste where the solid lubricant is uniformly dispersed in the PTFE resin. Meanwhile, substantially spherical particles of bronze are uniformly sprayed to a thickness of approximately 300μ over a steel strip and are then sintered in this state to obtain a porous metallic sintered layer on the steel strip.

The paste prepared as above is then coated on the porous metallic sintered layer by thinly rolling it with a coating roller. The pressure in the roller coating is controlled such that the solid lubricant is dispersed in a striation consisting of multiple layers extending substantially parallel to the curved and plane surfaces of the metallic particles of the sintered layer. Thereafter, the system is baked at a temperature above 350° C., preferably in a temperature range of 360° to 390° C.

Preferably, lead oxide is used as the solid lubricant. Lead oxide, unlike metallic lead, has a very high melting point, which is very suited for high speed, high load operation.

An example will now be given.

A PTFE resin dispersion with a solid concentration of 60 to 62% by weight was prepared by dispersing PTFE resin with an average grain size of 0.2 to 0.4μ.

Meanwhile, lead oxide was pulverized into powder with an average grain size of approximately 30μ, and the powder was rolled with a roller to obtain scalelike lead oxide with a thickness of 10μ or less.

To 100 parts by weight of the scalelike lead oxide were added 100 parts by weight of the PTFE resin dispersion and 30 parts by weight of an organic solvent, e.g., toluene or xylene. The mixture was then kneaded by uniformly agitating it. At this time, the PTFE resin particles were gradually rendered fibrous with shearing force applied to them to obtain a paste, in which the PTFE resin particles and scalelike lead oxide entangle one another.

Further, substantially spherical bronze particles were uniformly sprayed to a thickness of 300μ over a steel strip and were sintered in this state to form a porous metallic sintered layer on the steel plate.

The paste noted above was then coated on the sintered layer and thinly rolled using a coating roller, followed by baking at a temperature of about 370° C. The dry bearing obtained in this way, has a sectional structure, with thinly rolled lead oxide as a solid lubricant 6 in a striation consisting of multiple layers extending substantially parallel to the sources of the metallic particles 4a of the sintered layer 4, as shown in FIG. 2.

Besides, a dry bearing was also produced in the manner as described except for that metallic lead in the form of a mass was used in lieu of lead oxide and pulverized and then thinly rolled to obtain scalelike metallic lead. This dry bearing had a similar structure, with the scalelike metallic lead being converted to lead oxide during the baking. As a contrast, metallic lead which was not rolled after pulverization, was kneaded with the dispersion. In this case, the metallic lead was hardly oxidized and remained as such during the baking.

Figure 1:
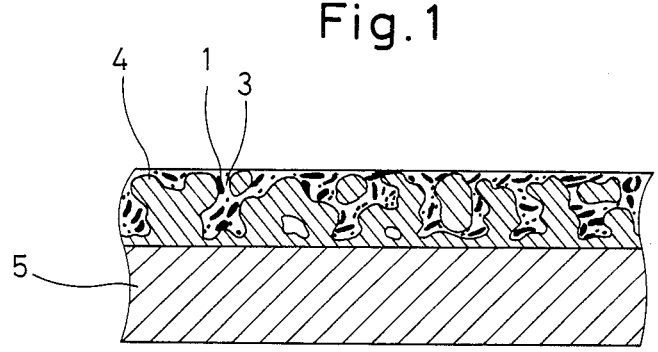
FIG. 1 is a fragmentary enlarged-scale sectional view showing a prior art dry bearing.
Figure 5:
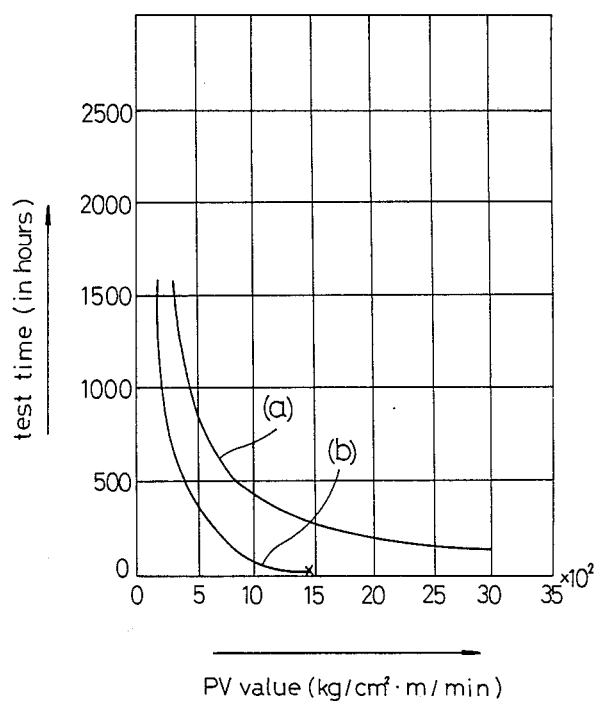
FIG. 5 is a graph showing the results of tests on the embodiment of the dry bearing according to the invention shown in FIG. 2 and the prior art dry bearing shown in FIG. 1 about a relation between test time (in hours) and threshold PV value, with curve (a) representing a characteristic of the dry bearing according to the invention and curve (b) representing a characteristic of the prior art dry bearing.

The threshold PV value of the two dry bearings with scalelike lead oxide noted above, was measured using a wear tester of Suzuki, Matsubara type to obtain results as shown by curve (a) in FIG. 5. Curve (b) in FIG. 5 represents a characteristic of the contrast dry bearing, which has a structure as shown in FIG. 1, with metallic lead 1 dispersed. It will be understood that the bearing material according to the invention can withstand high speed, high load operating conditions compared to the contrast bearing material. The tests in connection with FIG. 4 were carried out using S45C material for the counterpart member, under a pressure of 100 kg/cm or below, at a peripheral speed of 30 m/min or above and without lubrication. In FIG. 5, the ordinate is taken for test time in hours, and the abscissa is taken for the PV value in kg/cm$^2$.m/min.

Figure 6:
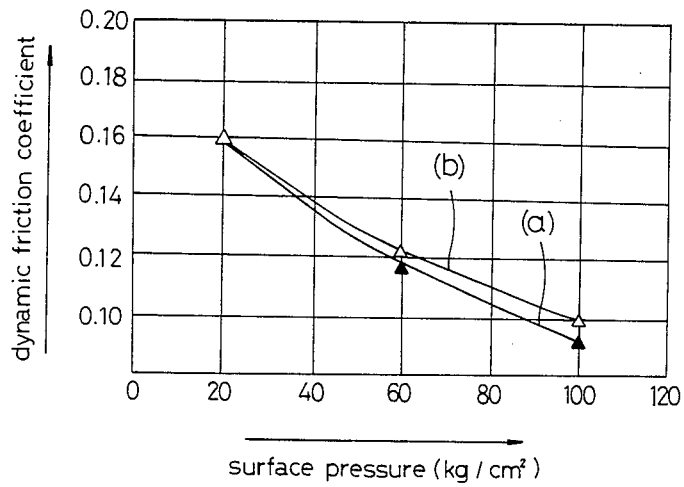
FIG. 6 is a graph showing the results of tests on the embodiment of the dry bearing according to the invention and the prior art dry bearing about a relation between dynamic friction coefficient and surface pressure, with curve (a) representing a characteristic of the dry bearing according to the invention and curve (b) representing a characteristic of the prior art dry bearing.
Figure 7:
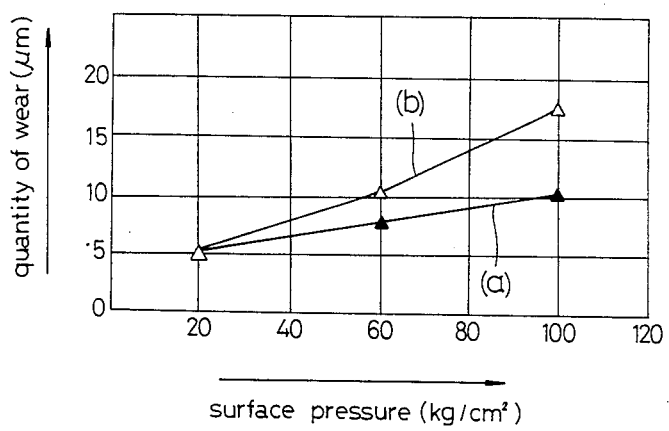
FIG. 7 is a graph showing the results of tests on the embodiment of the dry bearing according to the invention and the prior art dry bearing about a relation between wear and surface pressure, with curve (a) representing a characteristic of the dry bearing according to the invention and curve (b) representing a characteristic of the prior art dry bearing.

Further, the dynamic friction coefficient and wear were measured with lubrication-free thrust load for various surface pressures with respect to the counterpart member. FIGS. 6 and 7 show the results. In these Figures, curves (a) represent characteristics of the dry bearing according to the invention, and curves (b) represent characteristics of the contrast dry bearing. The tests were carried out using S45C material for the counterpart member, with a hardness of HRC55, for a test time of 60 min. and at a speed of 15 m/min. It will be seen from FIGS. 6 and 7 that the dry bearing material according to the invention has performance, which is increasingly superior to that of the contrast bearing material with increasing surface pressure, and particularly under high load.

FIG. 8 shown the results of further lubricationfree thrust load tests conducted using S45C material (with a hardness of HRC55) for the counterpart member and under conditions of a surface pressure of 100 kg/cm and a slip speed of 30 m/min, i.e., at a PV value of 3,000 kg/cm$^2$.m/min. In FIG. 8, curve (a) represents a characteristic of the dry bearing material according to the invention, and curve (b) represents a characteristic of the contrast dry bearing material. It will be obvious that the dry bearing material according to the invention can sufficiently withstand even such a severe operation condition as double the PV value with the prior art contrast dry bearing material, i.e., 1,000 to 1,500 kg/cm$^2$.m/min, and thus be used in a wire range of operation conditions.

What is claimed is:

1. A dry bearing comprising a porous metallic sintered layer formed on a steel plate and a resin paste layer of a resin paste material consisting of a solid lubricant and a polytetrafluoroethylene resin, said resin paste material filling the interstices defined by metallic particles of said sintered layer and also covering the surface of said sintered layer, said solid lubricant being dispersed in said resin paste material in a thinly rolled leaf-like or scalelike form and in a striation consisting of multiple layers spaced apart one above another and extending substantially parallel to the surface of said sintered layer and curved and plane surfaces of the internal metallic particles of said sintered layer.

2. The dry bearing according to claim 1, whereby said solid lubricant consists of one or more members of a group consisting of a sulfides of metals, intermetallic compounds, metals, oxides of metals, fluorides of metals, boron nitride, fluorocarbon and carbon fiber.

3. The dry bearing according to claim 1, wherein said solid lubricant is lead oxide.

* * * * *